Nov. 30, 1971     N. D. MASLOKOVETS     3,623,239
SCIENTIFIC MODEL TOYS
Filed Aug. 28, 1970

*INVENTOR*
NIKOLAY D. MASLOKOVETS

BY *Walter S. Paul*

ATTORNEY

United States Patent Office 3,623,239
Patented Nov. 30, 1971

3,623,239
SCIENTIFIC MODEL TOYS
Nikolay D. Maslokovets, 4204-2 Knox Road,
College Park, Md. 20740
Filed Aug. 28, 1970, Ser. No. 67,741
Int. Cl. G09b 23/20
U.S. Cl. 35—19 R                                    6 Claims

ABSTRACT OF THE DISCLOSURE

The apparatus is a mechanical model of the cyclotron which may be used as a toy for amusement or as an educational toy. It serves to show the working principle of the cyclotron. The working principle of the betatron may likewise be shown by the same apparatus using a circular ring in place of the spiral raceway for the ball. Apparatus may serve for lectures in physics in high school, college, university or as a scientific toy or just as a toy.

In the cyclotron, acceleration of the particles is made by a periodic electric field between two semicircular electrodes and a magnetic field holds the particles in a spiral.

In this model, instead of an electrical field we use the gravitational field. Instead of a particle, we use a small ball and instead of a magnetic bond we use the spiral tube. Here the periodic electric field is analogous to the periodic gravitational field which we obtain by oscillation of the spiral tube and the ball.

In the betatron model, the ball is restricted to a circular path in a ring tube. The details of the models for acceleration of the ball are shown in the drawings, wherein.

Figure 1:
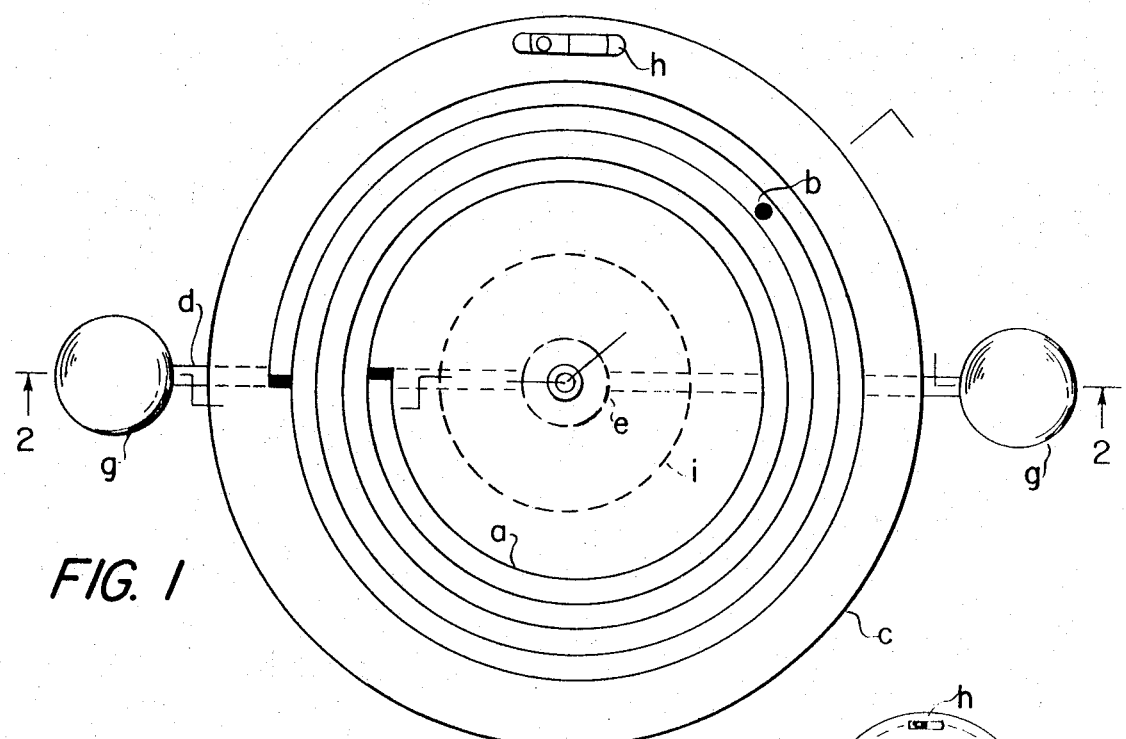
FIG. 1 is a plan view of the cyclotron model of the present invention.
Figure 3:
FIG. 3 is a detail view of the knife edge element by which the pendulum of the model is suspended for oscillation.

In the drawings, $a$ is a transparent spiral made of plastic tubing with a 4 mm. ball $b$ inside. The ends of the spiral are closed by stoppers. The spiral is fixed between two plexiglass discs $c$. The bent rod $d$ with two weights $g$ is connected with discs by a screw $f$ which has a knife edge at its lower end resting in the groove on the top of the support $e$. When the pendulum $gg$ oscillates, the ball moves forward and back along the spiral.

The period of the pendulum and the period of rotation of the ball are not exactly equal. If the phase difference between the ball and the pendulum is small, the ball moves fast. If the phase difference is large, the ball stops when the phases are opposite. The vibration of the apparatus is stable because the center of mass is below the point of the knife edge suspension of the pendulum.

On the side of the disc is a level $h$. When the apparatus is set on a VU-graph everybody in the class can see the motion of the ball and the bubble of the level.

On the disk are drawn two semicircles to simulate the electrodes. If the apparatus is used as a toy it can be made simpler and more amusing:

(1) Instead of tubing one can use a spirally curved strip.

(2) One can use many different colored balls.

(3) One can use metal sounding plates instead of stoppers on the ends of the spiral.

(4) The size of the pendulum and disks can be made smaller.

(5) The spiral, disk and wedge rest can be manufactured as one piece.

(6) One can use simple suspension and a single pendulum.

(7) One can use a pointed support instead of wedge support (conical pendulum).

(8) A lightweight gyroscope can be balanced on the top of the screw (with its center of mass lower than its point of rest).

(9) One can paint the gyroscope spirally with seven spectral colors for demonstration of color mixing and inertia during rotation.

Figure 4:
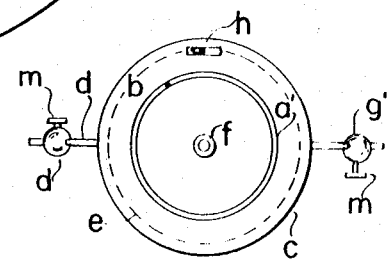
FIG. 4 is a plan view of a modification of this invention for demonstrating the betatron principle of oscillation.
Figure 2:
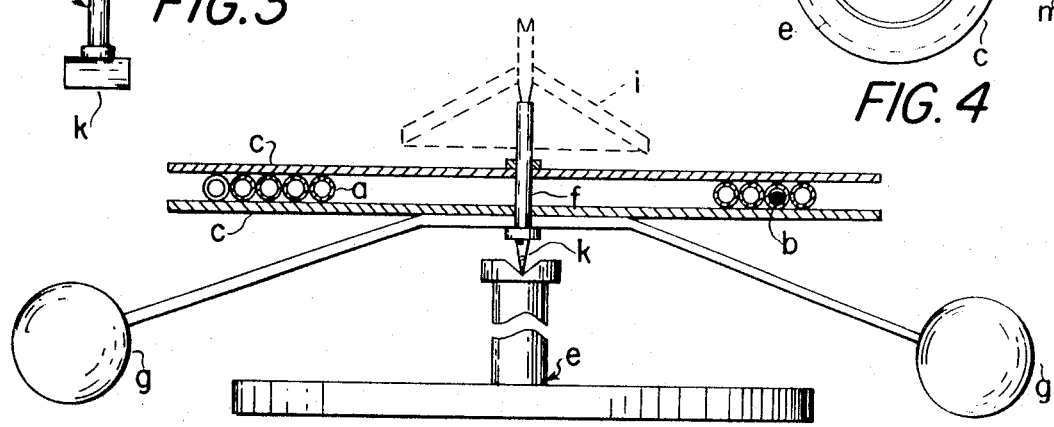
FIG. 2 is a sectional view in elevation of the cyclotron model taken on the line 2—2 of FIG. 1.
Figure 5:
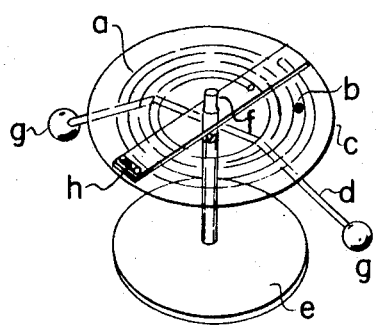
FIG. 5 is a perspective view of the cyclotron model.

In FIG. 4, the pendulum weights $g'$ are made adjustable by set screws $m$ on the rod $d$ so that the period may be varied and so that the discs may be levelled when the pendulum is at rest. This betatron model has the circular tube $a'$ in which the ball is free to move in a circular path, demonstrating the principles of the betatron.

Many other modifications in the shape and arrangement of the pendulum and rotational path of the ball and other parts may obviously be made to provide toys of a purely amusing character or to demonstrate other interesting phenomena of nature either physical or electrical.

What is claimed is:

1. A toy model for graphically demonstrating some physical and electrical phenomena, comprising
    a base having an upright support with a groove in its top,
    a pendulum having a horizontal disc centrally located over its point of suspension in said groove,
    a transparent curvilinear tube mounted on said disc around its center, and
    at least one ball freely movable in said tube in response to oscillations of said pendulum.

2. A toy model as defined in claim 1,
    said pendulum having a knife edge fulcrum extending across its axis to limit its direction of oscillation.

3. A toy model as defined in claim 1,
    said curvilinear tube being spiral in form.

4. A toy model as defined in claim 1,
    said curvilinear tube being of circular ring form.

5. A toy model as defined in claim 1,
    said horizontal disc having a central vertical projection with a conical depression in its top adapted to receive and support the point of a spinning top or gyroscopic member that may be placed therein.

6. A toy model as defined in claim 1,
    said pendulum comprising a diametrically extending rod under said horizontal disc,
    said rod having its opposite ends bent downwardly and a weight mounted at each of said ends.

References Cited

UNITED STATES PATENTS

| | | | |
|---|---|---|---|
| 1,309,838 | 7/1919 | Bonnet | 46—131 |
| 3,098,316 | 7/1963 | McCarthy | 46—47 X |
| 3,317,209 | 5/1967 | Dixon | 35—18 A X |
| 3,402,929 | 9/1968 | Glass | 46—131 X |

HARLAND S. SKOGQUIST, Primary Examiner

U.S. Cl. X.R.

46—47, 131